United States Patent [19]

Castner et al.

[11] 4,383,097

[45] May 10, 1983

[54] MOLECULAR WEIGHT REGULATION OF CIS-1,4-POLYBUTADIENE

[75] Inventors: Kenneth F. Castner, Uniontown; Paul H. Sandstrom, Tallmadge, both of Ohio

[73] Assignee: The Goodyear Tire & Rubber Company, Akron, Ohio

[21] Appl. No.: 295,037

[22] Filed: Aug. 21, 1981

[51] Int. Cl.$^3$ .............................................. C08F 4/70
[52] U.S. Cl. .................................. 526/133; 526/137; 526/340.4; 526/903
[58] Field of Search ........................ 526/133, 137, 903

[56] References Cited

U.S. PATENT DOCUMENTS

| | | | |
|---|---|---|---|
| 3,170,907 | 2/1965 | Ueda et al. ........................... | 526/133 |
| 3,483,177 | 12/1969 | Throckmorton et al. ........ | 526/340.4 |
| 3,528,957 | 9/1970 | Throckmorton et al. .......... | 526/133 |
| 3,725,492 | 4/1973 | Ukita et al. ......................... | 526/138 |
| 3,856,764 | 12/1974 | Throckmorton et al. .......... | 526/137 |
| 3,910,869 | 10/1975 | Throckmorton ................... | 526/137 |
| 3,962,375 | 6/1976 | Throckmorton et al. .......... | 526/903 |
| 4,020,255 | 4/1977 | Schoneman et al. ................ | 526/133 |

OTHER PUBLICATIONS

Die Makro Chemie, Sakata et al., 13 9 (1970) 73-81.

*Primary Examiner*—Stanford M. Levin

*Attorney, Agent, or Firm*—J. Y. Clowney; Alvin T. Rockhill

[57] ABSTRACT

There is disclosed a process for the regulation of the molecular weight of high cis polybutadiene prepared by polymerizing butadiene under solution polymerization conditions employing as the catalyst system a mixture of (a) organoaluminum compounds; (b) organonickel compounds; and (c) fluorine containing compounds; said polymerization being conducted in the presence of nonconjugated diolefins of the formula of the structure

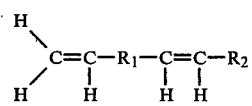

wherein $R_1$ may be; $-CH_2-$; $-C_2H_4-$; $-C_3H_6-$;

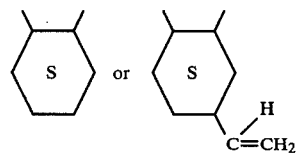

and $R_2$ may be H, $-CH_3$, $-C_2H_5$ or $-C_3H_7$ and $R_2$ is trans to $R_1$.

14 Claims, No Drawings

MOLECULAR WEIGHT REGULATION OF CIS-1,4-POLYBUTADIENE

TECHNICAL FIELD

This invention relates to the regulation of the molecular weight of 1,4-polybutadiene prepared from 1,3-butadiene by means of a catalyst system comprising aluminum alkyls, soluble nickel salts and a third component which contains fluorine.

BACKGROUND OF THE INVENTION

The polymerization of 1,3-butadiene to form high cis-1,4-polybutadiene employing organonickel based catalyst systems has been described in several patents and publications.

In U.S. Pat. No. 3,856,764, issued Dec. 24, 1974, there is disclosed a process for producing cis-1,4-polybutadiene by contacting 1,3-butadiene with a catalyst consisting of (1) at least one organoaluminum compound, (2) at least one nickel compound selected from a class consisting of nickel salts of carboxylic acids, organic complex compounds of nickel and nickel tetracarbonyl and (3) at least one hydrogen fluoride complex prepared by complexing hydrogen fluoride with one or more members of a class consisting of ketones, esters, ethers, alcohols, nitriles and water.

In U.S. Pat. No. 3,528,957, issued Sept. 15, 1970, there is described the solution polymerization of butadiene to form high cis polybutadiene which comprises polymerizing butadiene in the presence of an organometal compound of groups 1, 2, and 3 of the Periodic Table with particular emphasis to trialkyl aluminum compounds and (2) at least one compound from the class consisting of organonickel compounds, and (3) at least one boron trifluoride complex prepared by complexing boron trifluoride with a member of the class consisting of monohydric alcohols, phenols, water and mineral acids containing oxygen.

In U.S. Pat. No. 3,910,869 issued Oct. 7, 1975, there is disclosed a process for the polymerization of butadiene to form polymers containing a high proportion of the butadiene units in the cis-1,4 configuration which comprises contacting the butadiene under solution polymerization conditions with a catalyst comprising (1) an organoaluminum compound, (2) an organonickel compound and (3) hydrogen fluoride.

In U.S. Pat. No. 3,483,177, issued Dec. 9, 1969, there is disclosed a process for the polymerization of butadiene to form polybutadiene containing a high proportion of the butadiene units in the cis-1,4 configuration which comprises contacting butadiene under polymerization conditions with a catalyst comprising (1) at least one organometallic compound in which the metal is selected from Groups I, II, and III of the Periodic System; (2) at least one organometallic compound selected from the class of nickel salts of carboxylic acids, organic complex compounds of nickel and nickel carbonyl; and (3) at least one boron trifluoride complex prepared by complexing boron trifluoride with a member of the class consisting of ketones, aldehydes, esters and nitriles.

In U.S. Pat. No. 4,020,255, issued Apr. 26, 1977, there is disclosed a process for preparing high cis-1,4-polybutadiene which comprises continuously polymerizing butadiene in an inert aliphatic or cycloaliphatic solvent using as a catalyst a mixture comprising (a) at least one trialkylaluminum wherein the alkyl group contains from 2 to 8 carbon atoms; (b) at least one nickel salt of a carboxylic acid; and (c) at least one boron trifluoride complex of ethers in which each of the individual catalyst components are continuously injected into the polymerization vessel containing the mixture of butadiene and inert solvent.

Furthermore, the polymers obtained from these polymerizations are of fairly high molecular weight in the neighborhood of 3.0 or greater than 3 DSV (dilute solution viscosity).

In U.S. Pat. No. 3,170,907, issued Feb. 23, 1965, there is disclosed a process for the conversion of butadiene to a solid polybutadiene polymer having a high content of cis-1,4-configuration by contact with a catalyst system comprising (a) a nickel salt of an organic acid, (b) a boron trifluoride etherate, and (c) an organometallic compound of aluminum.

One of the nickel based catalyst systems which have been described above which is of significant industrial importance is the one which employs a nickel carboxylate compound in conjunction with an organoaluminum compound and hydrogen fluoride or a hydrogen fluoride etherate.

The second most important industrial catalyst system based on nickel to catalyze polybutadiene is the system employing a nickel carboxylate in conjunction with an organoaluminum compound and boron trifluoride etherate. This system also yields extremely high cis-1,4-polybutadiene. However, the molecular weights are slightly lower than the system employing the hydrogen fluoride or hydrogen fluoride complexes.

In many applications of cis-1,4-polybutadiene, it is usually desirable to employ lower molecular weight polymers than those generally obtained from either one of the immediately aforementioned polymerization systems. For example, in certain tire applications it is desirable to use a high cis-1,4-polybutadiene having a DSV of about 3. On the other hand, if the high cis-1,4-polybutadiene is used in a sealant or in a paint, liquid polybutadienes are usually employed.

The invention described herein deals with the use of various hydrocarbon compounds as molecular weight regulators for the above-mentioned polybutadiene syntheses. The utilization of these molecular weight regulators expands the scope of the organoaluminum/organonickel/fluorine catalyzed 1,3-butadiene polymerization systems in a manner that they can be used for the synthesis of cis-1,4-polybutadiene ranging from an extremely high molecular weight elastomer to a liquid polymer. These syntheses of various molecular weight polybutadienes can readily be effected in an anionic or an emulsion polymerization system by the mechanism of the catalyst level or the chain transfer level, respectively. However, these polymerization systems do not yield high cis-1,4-structure typical of the aluminum/nickel/fluorine-based solution polymerizations mentioned above. For example, a typical alkyllithium initiated (anionic) 1,3-butadiene polymerization generally yields polymers containing 36–44 weight percent cis-1,4 polymer, 48–50 percent trans-1,4 polymer and 8–10 percent, 1,2 structures. On the other hand, a typical emulsion polymerization of butadiene yields a polymer containing about 60 percent trans-1,4 structure, about 20 percent cis-1,4 structure, and about 20 percent 1,2 structure.

Liquid polybutadienes have been synthesized using nickel compounds and alkylaluminum halides. However, these catalyst systems do not yield a very high cis-1,4-structure in the polybutadiene which is typical of the nickel carboxylate/aluminum alkyl/fluorine-containing systems, nor do they have the flexibility to yield high molecular weight polymers.

The uniqueness of the present invention is that it expands the scope of the high cis-1,4 directing 1,3-butadiene polymerization systems such that they can be employed for the synthesis of polymers ranging from an elastomer to an oily liquid.

The effect of certain hydrocarbon compounds on polymer intrinsic viscosity ([η]) in 1,3-butadiene polymerization employing a nickel-based catalyst system was studied by Sakata et al, in Die Makromolekulare Chemie. 139 (1970) 73–81. These studies employed a triethyl aluminum/nickel carboxylate/boron trifluoride catalyst system in benzene solvent. The compounds screened in this study included saturated hydrocarbons, such as propane, n-butane and isobutane; alpha-olefins, such as propylene, butene-1, and isobutene; internal olefins, such as cis and trans butene-2 and concentrated diolefins, such as allene and 1,2-butadiene; acetylenes, such as acetylene, methylacetylene and vinylacetylene and a nonconjugated diolefin, 4-vinylcyclohexene-1. The authors of this paper concluded that saturated hydrocarbons and monoolefins, such as α-olefins and internal olefins show no effect on the polymer viscosity nor on the conversion. They found that 4-vinylcyclohexene has the effect of lowering the polymer viscosity, however, to do so required such an amount as to preclude its employment as a useful molecular weight regulator. The acetylenes did lower the molecular weight but they have a very dramatic, detrimental effect on polymer yield.

Another nickel-based catalyzed 1,3-polybutadiene system employing a molecular weight regulator is that reported by Ukita and and coworkers, in U.S. Pat. No. 3,725,492, issued Apr. 3, 1973. Ukita et al prepared liquid oligomeric polybutadienes containing about 70 percent cis-1,4-configuration by carrying out the butadiene polymerization by using $R_nAlCl_{3-n}$ wherein R is an alkyl of 1—carbons, nickel salts of carboxylic acids, and water in the presence of 1-butene. These patentees produced a polymer which was in the nature of an oil and was liquid.

SUMMARY OF THE INVENTION

The description of the catalyst system employed in the process of this invention will be organoaluminum compounds/organonickel compounds/fluorine compounds. These terms will be described in greater detail later in this application.

The invention comprises a process for the regulation of the molecular weight of high cis polybutadiene prepared by polymerizing butadiene under solution polymerization conditions employing as the catalyst system a mixture of (a) organoaluminum compounds; (b) organonickel compounds; and (c) fluorine containing compounds; said polymerization being conducted in the presence of nonconjugated diolefins of the formula of the structure:

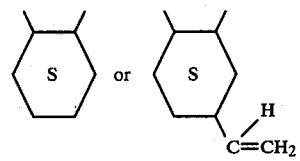

wherein $R_1$ may be: $-CH_2-$; $-C_2H_4-$; $-C_3H_6-$;

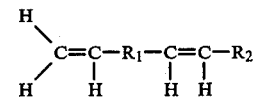

and $R_2$ may be H, $-CH_3$, $-C_2H_5$ or $-C_3H_7$ and $R_2$ is trans to $R_1$.

DETAILED DESCRIPTION

The molecular weight regulating hydrocarbons useful in the practice of this invention may be represented by the formula:

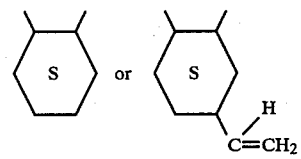

wherein $R_1$ maybe: $-CH_2-$; $-C_2H_4-$; $-C_3H_6-$;

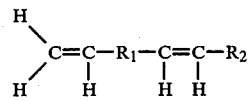

and $R_2$ may be H, $-CH_3$, $-C_2H_5$ or $-C_3H_7$ and $R_2$ is trans to $R_1$.

Representative examples of such nonconjugated diolefins are 1,4-pentadiene, 1,5-hexadiene, 1,6-heptadiene, 1,2,4-trivinylcyclohexane, 1,2-divinylcyclohexane, and 1-trans-4-hexadiene.

By the term "organoaluminum compound" is meant any organoaluminum compound responding to the formula:

in which $R_1$ is selected from the group consisting of alkyl (including cycloalkyl), aryl alkaryl, arylalkyl, alkoxy, and hydrogen; $R_2$ and $R_3$ being selected from the group of alkyl (including cycloalkyl), aryl, alkaryl, and arylalkyl. Representative of the compounds responding to the formula set forth above are diethyl aluminum hydride, di-n-propyl aluminum hydride, di-n-butyl aluminum hydride, diisobutyl aluminum hydride, diphenyl aluminum hydride, di-p-tolyl aluminum hydride, dibenzyl aluminum hydride, phenylethyl aluminum hydride, phenyl-n-propyl aluminum hydride, p-tolyl ethyl aluminum hydride, p-tolyl n-propyl aluminum hydride, p-tolyl isopropyl aluminum hydride, benzyl ethyl aluminum hydride, benzyl n-propyl aluminum hydride, and benzyl isopropyl aluminum hydride and other organoaluminum hydrides. Also included are trimethyl aluminum, triethyl aluminum, tri-n-propyl aluminum, triisopropyl aluminum, tri-n-butyl aluminum, triisobutyl aluminum, tripentyl aluminum, trihexyl aluminum, tricyclohexyl aluminum, trioctyl aluminum, triphenyl aluminum, tri-p-tolyl aluminum, tribenzyl aluminum, ethyl diphenyl aluminum, ethyl di-p-tolyl aluminum, ethyl dibenzyl aluminum, diethyl phenyl aluminum, diethyl p-tolyl aluminum, diethyl benzyl aluminum and other triorganoaluminum compounds. Also included are diethylaluminum ethoxide, diisobutylaluminum ethoxide and dipropylaluminum methoxide.

The component of the catalyst of this invention which contains nickel may be any organonickel compound. It is preferred to employ a soluble compound of nickel. Thus, nickel salts of carboxylic acids and organic complex compounds of nickel are suitable. These soluble nickel compounds are normally compounds of nickel with a mono or bi dentate organic ligand containing up to 20 carbons. "Ligand" is defined as an ion or molecule bound to and considered bonded to a metal atom or ion. Mono dentate means having one position through which covalent or coordinate bonds with the metal may be formed; bi dentate means having two positions through which covalent or coordinate bonds with the metal may be formed. By the term "soluble" is meant soluble in inert solvents. Thus, any salt or an organic acid containing from about 1 to 20 carbon atoms may be employed. Representative of organonickel compounds are nickel benzoate, nickel acetate, nickel naphthenate, nickel octanoate, bis($\alpha$-furyl dioxime)nickel, nickel palmitate, nickel stearate, nickel acetylacetonate, nickel salicaldehyde, bis(salicylaldehyde) ethylene diimine nickel, bis(cyclopentadienyl) nickel, cyclopentadienylnickel nitrosyl and nickel tetracarbonyl. The preferred component containing nickel is a nickel salt of a carboxylic acid or an organic complex compound of nickel.

Another component of the catalyst system employed in this invention is a fluorine containing compound. The fluorine may be supplied by hydrogen fluoride, boron trifluoride, or by hydrogen fluoride and boron trifluoride being complexed with a member of the class consisting of monohydric alcohols, phenols, water, mineral acids containing oxygen, water, aldehydes, esters, ethers, ketones and nitriles.

The ketone subclass can be defined by the formula R'COR where R' and R represent a alkyl, cycloalkyl, aryl, alkaryl and arylalkyl radicals containing from 1 to about 30 carbon atoms; R' and R may be the same or dissimilar. These ketones represent a class of compounds which have a carbon atom attached by a double bond to oxygen. Representative but not exhaustive of the ketones useful in the preparation of the boron trifluoride and hydrogen fluoride complexes of this invention are acetone, methyl ethyl ketone, dibutyl ketone, methyl isobutyl ketone, ethyl octyl ketone, 2,4-pentanedione, butyl cycloheptanone, acetophenone, amylphenyl ketone, butylphenyl ketone, benzophenone, phenyltolyl ketone, quinone and the like. The preferred complexes of the ketones are boron trifluoride.acetophenone and boron trifluoride.benzophenone, also hydrogen fluoride.acetophenone and hydrogen fluoride.benzophenone and hydrogen fluoride.acetone.

The aldehyde subclass can be defined by the formula R—CHO where R represents an alkyl, cycloalkyl, aryl, alkaryl and arylalkyl radical containing from 1 to about 30 carbon atoms. The aldehydes have a carbon atom attached to an oxygen atom by means of a double bond. Representative but not exhaustive of the aldehydes are butyraldehyde, anisaldehyde, cinnamic aldehyde, isobutyraldehyde, heptaldehyde, dodecylaldehyde, benzaldehyde, phenylacetaldehyde, tolualdehyde, m-nitrobenzaldehyde, p-nitrobenzaldehyde, m-hydrobenzaldehyde and the like. The preferred complexes formed from the aldehydes are boron trifluoride.benzaldehyde, boron trifluoride.tolualdehyde and boron trifluoride.m-nitrobenzaldehyde; also hydrogen fluoride.benzaldehyde and hydrogen fluoride.tolualdehyde.

The ester subclass can be represented by the formula R'—COOR where R' and R are represented by alkyl, cycloalkyl, aryl, alkaryl, and arylalkyl radicals containing from 1 to about 30 carbon atoms. The esters contain a carbon atom attached by a double bond to an oxygen atom. Representative but not exhaustive of the esters are ethyl butyrate, ethyl octanoate, isopropyl hexanoate, amyl acetate, hexyl propionate, cetyl acetate, ethyl benzoate, amyl benzoate, phenyl acetate, phenyl butyrate, phenyl benzoate and the like. The preferred complexes formed from the esters are boron trifluoride.ethyl benzoate and boron trifluoride.phenyl acetate; also hydrogen fluoride.ethyl benzoate, and hydrogen fluoride.phenyl acetate.

The nitrile subclass can be represented by the formula RCN wherein R represents an alkyl, cycloalkyl aryl, alkaryl, and arylalkyl. The nitriles contain a carbon atom attached to a nitrogen atom by a triple bond. Representative but not exhaustive of the nitrile subclass are acetonitrile, butyronitrile, acrylonitrile, benzonitrile, tolunitrile, phenylacetonitrile, and the like. The preferred complex prepared from the nitriles is boron trifluoride.benzonitrile, and hydrogen fluoride.benzonitrile.

The monohydric alcohol subgroup of the above class of compounds can be symbolically portrayed as R—OH where R represents an alkyl, cycloalkyl, and an arylalkyl radical containing from 1 to 30 carbon atoms. Representative, but not exhaustive of the alcohol group, are methanol, ethanol, n-propanol, isopropanol, n-butanol, benzyl alcohol, and the like. The preferred complexes formed from the above group are as follows:
$BF_3$.methanol
$BF_3$.ethanol
$BF_3$.butanol
HF.methanol
HF.butanol The phenol subgroup of the above class of compounds can be symbolically portrayed as $\phi$—OH where $\phi$ represents a benzenoid group. Representative but not exhaustive of the phenol group are phenol, p-cresol, resorcinol, naphthol, hydroquinone and the like.

The preferred complexes formed from the above phenol subgroup are as follows:
$BF_3$.2 phenol
$BF_3$.p-cresol
HF.p-cresol
HF.phenol A number of the members in the subgroup mineral acids containing oxygen will complex with $BF_3$ and HF. Representative but not exhaustive of the mineral acid subgroup are phosphoric acid, sulfuric acid, nitric acid and the like. The preferred complexes formed from the mineral acid subgroup are $BF_3$—100% phosphoric acid and $BF_3$—85% phosphoric acid, and HF—100% phosphoric acid.

Water, although in a subgroup by itself, forms at least two hydrate complexes. These are $BF_3.H_2O$ and $BF_3.2H_2O$.

When not available commercially, many of the boron trifluoride complexes can be readily formed by directly contacting boron trifluoride gas, (a colorless gas at ordinary temperatures and pressures, its boiling point being —101° C.) with the compound used as the complexing agent, that is, the electron donor compound. This contact is accomplished with a reacting apparatus combined with a sensitive weighing mechanism in order to achieve the desired mole ratios between the $BF_3$ and the electron donor compound. The reaction is carried out under an inert atmosphere. The reaction environment may consist only of the reacting components, $BF_3$ gas and the electron donor compound, or when convenient, the reaction may be carried out in the medium of an inert organic diluent. This last condition is usually necessary when the electron donor compound exists as a solid and must be put into solution or suspension to insure adequate contact with the $BF_3$ gas.

The various boron trifluoride complexes vary greatly in their shelflife stability. Some, for example, $BF_3$.isopropanol are quite unstable in daylight at room temperature. Others, for example, $BF_3$.2 phenol are quite stable and possess a relatively long shelflife at room temperature. Where the particular $BF_3$ complex, specified as a catalyst component, possesses an unstable shelflife, it should be prepared as near to the time of polymerization as feasible.

Hydrogen fluoride is a limpid liquid which fumes strongly in air, is very poisonous, forms ulcerated sores if it comes in contact with the skin, and is very dangerous to handle or to manipulate. By complexing the hydrogen fluoride with the complexing agents heretofore mentioned, some of the advantages of this invention are a safer, easier and more accurate way of handling the hydrogen fluoride component of the catalyst system. Hydrogen fluoride complexes usually have a lower vapor pressure and do not fume as badly as does hydrogen fluoride. Hydrogen fluoride boils at 19.7° C., whereas a 40% by weight of hydrogen fluoride diethyl ether azeotrope boils at 74° C. When the hydrogen fluoride is complexed, the corrosiveness of the hydrogen fluoride is reduced. The hydrogen fluoride complex can be dissolved in a solvent and thus can be handled and charged to the system as a liquid solution. The solvent which can be employed may be an alkyl, alkaryl, arylalkyl or an aryl hydrocarbon. Benzene, for example, is a convenient solvent system.

The complexes of this invention are usually prepared by simply dissolving appropriate amounts of the complexing agent, for instance, a ketone, an ether, an ester, an alcohol, a nitrile or water, in a suitable solvent and an appropriate amount of the hydrogen fluoride in a suitable solvent and mixing the two solvent systems. The mixing of the complexing agents, except water, should be done in the absence of water vapor. Another possible method would be to dissolve either the hydrogen fluoride or the complexing agent in a suitable solvent and adding the other component. Still another method of mixing would be to dissolve the complexing agent in a solvent and simply bubble gaseous hydrogen fluoride through the system until the complexing agent is reacted with hydrogen fluoride. The concentrations may be determined by weight gain or chemical titration. The amount of complexing agent cannot be specifically set down. The amount of complexing agent may be a range depending on the conditions of the reaction system, the hydrogen bonding strength of the complexing agent, the size of the complexing agent, or it may be an equilibrium between the hydrogen fluoride complex and the hydrogen fluoride plus the complexing agent.

When the fluorine containing compounds is derived from boron trifluoride or a boron trifluoride complex, the optimum concentration from any one catalyst component changes from that when HF is employed, since boron trifluoride contains three atoms of fluorine, and thus the molar ratio of the catalyst components will be different. For instance, when the organoaluminum compound (Al) to the organonickel compound (Ni) ranges from about 0.3/1 to about 500/1, and when the mole ratio of the boron trifluoride complex prepared by complexing boron trifluoride with a member of the class consisting of esters, aldehydes, ketones and nitriles ($BF_3$.complex) to the organonickel compound (Ni) ranges from about 0.3/1 to about 300/1, and where the mole ratio of the organoaluminum (Al) to the $BF_3$.complex ranges from about 0.1/1 to about 4/1.

The preferred Al/Ni mole ratio ranges from about 1/1 to about 150/1; the preferred $BF_3$ or $BF_3$.complex/Ni mole ratio ranges from about 1/1 to about 150/1; and the preferred Al/$BF_3$.complex mole ratio ranges from about 0.3/1 to about 1.4/1.

When the fluorine containing compound is derived from hydrogen fluoride or a hydrogen fluoride complex, the polymerization activity is successful over a wide range of catalyst concentrations and catalyst ratios. The three catalyst components interact to form the catalyst components. As a result, the optimum concentration or any one catalyst component is very dependent upon the concentration of each of the other two catalyst components. Furthermore, while polymerization will occur over a wide range of catalyst concentrations and mole ratios, polymer having the most desirable properties are obtained over a more narrow range.

Polymerization can occur while the mole ratio of the organoaluminum compound (Al) to the organonickel compound (Ni) ranges from about 0.3/1 to about 300/1; the mole ratio of HF or hydrogen fluoride complex (HFC) to the organonickel compound (Ni) ranges from about 2/1 to about 300/1 and the mole ratio of hydrogen fluoride complex to the organoaluminum compound ranges from about 0.2/1 to about 15/1. However, the preferred mole ratios of Al/Ni ranges from about 2/1 to about 80/1, the preferred mole ratio of HF or HFC/Ni ranges from about 5/1 to about 100/1 and the preferred mole ratio of HF or HFC/Al ranges from about 0.4/1 to about 7/1.

The concentration of the catalyst employed depends on factors such as purity, rate desired, temperature and other factors, therefore, specific concentrations cannot be set forth except to say that catalytic amounts are used. Some specific concentrations and ratios which produce elastomers having desirable properties will be illustrated in the examples given herein to explain the teachings of this invention.

The three catalyst components of this invention can be charged separately to the reactor containing the butadiene and the solvent system therefore either stepwise or simultaneously. It has been discovered that when the three catalyst components of this invention are mixed together outside of the reactor and then added to the reactor, the catalyst system is not very active. Thus, the catalyst should not be preformed by mixing the three catalyst components together prior to contacting butadiene.

However, an improved preformed catalyst system can be prepared by mixing the three catalyst components together while in the presence of a small amount of a conjugated diolefin, for example, butadiene or isoprene. It appears that by mixing the three catalyst components together in the presence of the small amount of a diolefin seems to stabilize the catalyst system and allows the formation of a very active preformed catalyst.

The diolefin apparently reacts with the catalyst components to form a catalyst complex which is more stable and active, particularly, when the polymerization system contains more impurities than the "in situ" catalyst where the individual catalyst components are added to the reactor containing a very large amount of monomer and then allowed to react with each other. The improved preformed catalyst may be prepared by dissolving a small amount of diolefin in a hydrocarbon solvent such as benzene or hexane and then adding the organoaluminum component, the Ni component and then the $BF_3$ or HF-complex component to the solvent.

The particular order of adding in preforming the catalysts may be varied somewhat, but it is advantageous to have (1) the diolefin present before the addition of both the organoaluminum and Ni components and (2) the Ni component present before the addition of both the organo-aluminum and $BF_3$ or HF-complex catalyst components. The amount of the diolefin which can be present to form the improved preformed catalyst can be varied over a wide range, and of course, is somewhat dependent on the other catalyst concentrations.

The amount of diolefin used to preform the catalyst may be within the range of about 0.001 to 3 percent of the total amount of monomer to be polymerized. Expressed as a mole ratio of conjugated diolefin to nickel complex the amount of diolefin present during the preforming step can be within the range of about 1 to about 3000 times the concentration of nickel. The preferred mole ratio of conjugated diolefin to nickel is about 5:1 to 500:1. It is most preferred to use about 50:1 to about 100:1.

In general, the polymerizations of this invention are carried out in an inert solvent, and are, thus, solution polymerizations. By the term "inert solvent" is meant that the solvent or diluent does not enter into the structure of the resulting polymer nor does it have any adverse effect on the activity of the catalyst employed. Such solvents are usually aliphatic, aromatic, or cycloaliphatic hydrocarbons, examples of which are pentane, hexane, toluene, benzene, cyclohexane and the like. Preferred solvents are hexane and benzene. The solvent/monomer volume ratio may be varied over a wide range. Up to 20 or more to 1 volume ratio of solvent to monomer can be employed. It is usually preferred or more convenient to use a solvent/monomer volume ratio of about 3/1 to about 6/1. Suspension polymerization may be carried out by using a solvent, e.g. butane or pentane, in which the polymer formed is insoluble. It should be understood, however, that it is not intended to exclude bulk polymerizations from the scope of this application.

It is usually desirable to conduct the polymerizations of this invention employing air-free and moisture-free techniques.

The temperatures employed in the polymerizations of this invention are not critical and may vary from a very low temperature such as $-10°$ C. or below up to high temperatures such as $100°$ C. or higher. However, it is usually more desirable to employ a more convenient temperature between about $30°$ C. and about $90°$ C.

The practice of this invention is further illustrated by reference to the following examples which are intended to be representative rather than restrictive of the scope of this invention. Unless otherwise noted, all parts and percentages are by weight. Dilute solution viscosities (DSV) have been determined in toluene at $30°$ C. The amounts of the molecular weight regulators used in three examples are reported in parts per hundred of the monomer (phm) butadiene employed in the polymerizations.

The results of the experiments as set forth in the Tables following each individual example in which column 1 is the run number; column 2 is the regulator amount of the specific regulator mentioned in the text of the example; column 3 is the yield; column 4 is the dilute solution viscosity (DSV); and column 5 is the microstructure of certain of the polymers of each example.

EXAMPLE 1

A 1,3-butadiene/n-hexane (c.a. 14 weight percent 1,3-butadiene) solution was dried to polymerization grade by passing it through a silica gel column under nitrogen atmosphere. Aliquots (100 ml) of the column passed solution were dispensed into 4 oz. screw cap bottles fitted with punctured caps, self-sealing gaskets and Teflon TM liners.

A series of polymerizations were run to evaluate 1,4-pentadiene (modifier) as a molecular weight regulator. In a typical polymerization the modifier was added by hypodermic syringe to a polymerization bottle already containing monomer solution. Catalyst components were then added in the order; $2.0 \times 10^{-4}$ moles triisobutyl aluminum, $5.0 \times 10^{-6}$ moles nickel octoate, and finally $5.25 \times 10^{-4}$ moles hydrogen fluoride.n-butyletherate. The polymerization bottle was then placed in a $65°$ C. water bath and the bottle rotated end-over-end. After one hour the bottle was removed from the bath and the reaction terminated by adding triisopropanol amine ($\sim 1$ phm) and 2,6-ditertiary butyl-p-cresol (1 phm). Polymer dilute solution viscosity (DSV) was determined on 0.1 weight/volume percent toluene solution at $30°$ C. Polymer microstructure was determined by NMR analysis. Results are presented in Table I.

TABLE I

| Run No. | Regulator Amount | Yield | DSV | Cis 1,4 | Trans 1,4 | 1,2 |
|---|---|---|---|---|---|---|
| 1 | 0.30 | 97 | 3.22 | 97 | 1 | 2 |
| 2 | 0.59 | 95 | 2.86 | | | |
| 3 | 1.79 | 89 | 2.49 | | | |
| 4 | 2.98 | 77 | 2.40 | | | |
| 5 | 4.46 | 52 | 2.27 | | | |
| 6 | 5.59 | 50 | 2.04 | | | |
| Control | — | 95 | 3.80 | 97 | 1 | 2 |

EXAMPLE 2

A series of polymerizations were carried out essentially identical to those in Example 1, but employed 1,5-hexadiene as the modifier. Results are presented in Table II.

TABLE II

| Run No. | Regulator Amount | Yield | DSV | Cis 1,4 | Trans 1,4 | 1,2 |
|---|---|---|---|---|---|---|
| 1 | 0.06 | 95 | 3.39 | | | |
| 2 | 0.12 | 96 | 2.96 | | | |
| 3 | 0.24 | 95 | 2.51 | | | |
| 4 | 0.60 | 89 | 1.80 | | | |
| 5 | 1.20 | 85 | 1.39 | 97 | 1 | 2 |

TABLE II-continued

| Run No. | Regulator Amount | Yield | DSV | Cis 1,4 | Trans 1,4 | 1,2 |
|---|---|---|---|---|---|---|
| Control | — | 95 | 3.80 | 97 | 1 | 2 |

EXAMPLE 3

A series of polymerizations were carried out essentially identifical to those in Example 1, but employed 1,6-heptadiene as the modifier. Results are presented in Table III.

TABLE III

| Run No. | Regulator Amount | Yield | DSV |
|---|---|---|---|
| 1 | 0.31 | 92 | 2.36 |
| 2 | 0.62 | 95 | 1.90 |
| 3 | 1.86 | 91 | 1.21 |
| 4 | 3.10 | 66 | 0.92 |
| 5 | 6.20 | 79 | 0.66 |
| Control | — | 95 | 3.80 |

EXAMPLE 4

A series of polymerizations were carried out essentially identifical of those in Example 1, but employed 1-trans-4-hexadiene as a modifier. Results are presented in Table IV.

TABLE IV

| Run No. | Regulator Amount | Yield | DSV | Cis 1,4 | Trans 1,4 | 1,2 |
|---|---|---|---|---|---|---|
| 1 | 0.29 | 97 | 3.71 | | | |
| 2 | 0.86 | 98 | 3.39 | | | |
| 3 | 1.73 | 96 | 3.19 | | | |
| 4 | 2.87 | 95 | 2.93 | | | |
| 5 | 4.31 | 95 | 2.81 | | | |
| 6 | 5.74 | 92 | 2.51 | 97 | 1 | 2 |
| Control | — | 95 | 3.80 | 97 | 1 | 2 |

EXAMPLE 5

A series of polymerizations were carried out essentially identical to those in Example 1, but employed 1,2,4-trivinyl cyclohexane (mixed isomers) as the modifier. Results are presented in Table V.

TABLE V

| Run No. | Regulator Amount | Yield | DSV |
|---|---|---|---|
| 1 | 0.30 | 97 | 3.22 |
| 2 | 0.59 | 95 | 2.86 |
| 3 | 1.79 | 89 | 2.49 |
| 4 | 2.98 | 77 | 2.40 |
| 5 | 4.46 | 52 | 2.27 |
| 6 | 5.95 | 50 | 2.04 |
| Control | — | 95 | 3.80 |

EXAMPLE 6

A polymerization was carried out similar to Example 1 but employed a catalyst system consisting of $4.25 \times 10^{-5}$ moles triethyl aluminum, $2.5 \times 10^{-6}$ moles nickel octoate and $7.5 \times 10^{-5}$ moles boron trifluoride.n-butyl etherate, and 1,5-hexadiene as the modifier. Results are presented in Table VI.

TABLE VI

| Run No. | Regulator Amount | Yield | DSV |
|---|---|---|---|
| Control | — | 83 | 3.83 |
| 1 | 0.25 | 87 | 2.27 |

EXAMPLE 7

To 750 ml of 1,3-butadiene/n-hexane solution (same as described in Example 1) in a quart bottle, 7 gm 1,5-hexadiene was added followed by $3.98 \times 10^{-3}$ moles triisobutyl aluminum, $1.0 \times 10^{-4}$ moles nickel octoate and $9.75 \times 10^{-3}$ moles of hydrogen fluoride.n-butyl etherate. Reaction was run at 65° C. for two hours, then terminated by the addition of triisopropanolamine ($\sim 1$ phm) and 2,6-ditert-butyl-p-cresol ($\sim 1$ phm). Results are presented in Table VII.

TABLE VII

| Run No. | Regulator Amount | Yield | DSV | Cis 1,4 | Trans 1,4 | 1,2 |
|---|---|---|---|---|---|---|
| 1 | 10 | 88 | 0.36 | 96.8 | 1.4 | 1.8 |
| Control | — | 83 | 3.83 | 97 | 1 | 2 |

In order to indicate the advantages of the specific regulators set forth in accordance with the Summary of Invention and the claims, the following comparative experiments are presented. It will be evident that not all alpha, omega nonconjugated diolefins are suitable as an agent for reducing the molecular weight in accordance with the practice of this invention.

EXAMPLE 8

A series of polymerizations were carried out essentially identical to those in Example 1, but employed 1,7-octadiene as the modifier. Results are presented in Table VIII.

TABLE VIII

| Run No. | Regulator Amount | Yield | DSV |
|---|---|---|---|
| 1 | 0.63 | 98 | 3.73 |
| 2 | 1.27 | 97 | 3.76 |
| 3 | 3.17 | 98 | 3.60 |
| 4 | 6.34 | 95 | 3.53 |
| Control | — | 95 | 3.80 |

EXAMPLE 9

A series of polymerizations were carried out essentially identical to those in Example 1, but employed 1-cis-4-hexadiene as the modifier. Polymer DSV's and yields are presented in Table IX.

TABLE IX

| Run No. | Regulator Amount | Yield | DSV |
|---|---|---|---|
| 1 | 0.31 | 97 | 3.77 |
| 2 | 0.92 | 98 | 3.55 |
| 3 | 1.84 | 97 | 3.62 |
| 4 | 3.08 | 98 | 3.62 |
| 5 | 4.62 | 95 | 3.46 |
| 6 | 6.15 | 94 | 3.46 |
| Control | — | 95 | 3.80 |

EXAMPLE 10

A series of polymerizations were carried out essentially identical to those in Example 1, but employed 5-methyl-1,4-hexadiene as the modifier. Results are presented in Table X.

TABLE X

| Run No. | Regulator Amount | Yield | DSV |
|---|---|---|---|
| 1 | 0.26 | 98 | 3.87 |
| 2 | 0.81 | 96 | 3.70 |
| 3 | 1.62 | 92 | 3.62 |
| 4 | 2.69 | 80 | 3.25 |

TABLE X-continued

| Run No. | Regulator Amount | Yield | DSV |
|---|---|---|---|
| 5 | 4.05 | 92 | 3.67 |
| 6 | 5.39 | 91 | 3.59 |
| Control | — | 95 | 3.80 |

While certain representative embodiments and details have been shown for the purpose of illustrating the invention, it will be apparent to those skilled in this art that various changes and modifications may be made therein without departing from the scope of the invention.

I claim:

1. A process for the regulation of the molecular weight of high cis polybutadiene prepared by polymerizing butadiene under solution polymerization conditions, employing as the catalyst, a mixture of (a) organoaluminum compounds; (b) organonickel compounds; and (c) fluorine containing compounds; said polymerization being conducted in the presence of a molecular weight regulator comprising nonconjugated diolefins of the formula:

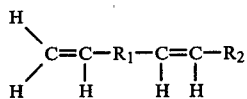

wherein $R_1$ is a member selected from the group consisting of $-CH_2-$; $-C_2H_4-$; $-C_3H_6$;

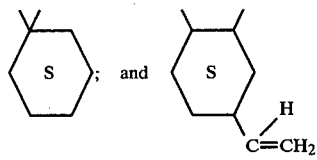

and wherein $R_2$ is a member selected from the group consisting of H, $-CH_3$, $-C_2H_5$ and $-C_3H_7$ and wherein $R_2$ is trans to $R_1$, said molecular weight regulator being employed in amounts ranging from 0.06 to 10 parts per 100 parts of butadiene.

2. A process according to claim 1 in which the fluorine compound of (a) is boron trifluoride or a boron trifluoride complex prepared by complexing boron trifluoride with a member selected from the group consisting of monohydric alcohols, phenols, water, mineral acids containing oxygen, aldehydes, esters, ethers, ketones and nitriles.

3. A process according to claim 1 in which the fluorine compound of (a) is hydrogen fluoride or a hydrogen fluoride complex prepared by complexing hydrogen fluoride with a member selected from the group consisting of monohydric alcohols, phenols, water, mineral acids containing oxygen, aldehydes, esters, ethers, ketones and nitriles.

4. The process according to claim 2 in which the molar ratio of the organoaluminum compound (Al) to the organonickel compound (Ni) ranges from about 0.3/1 to about 300/1, and the mole ratio of the boron trifluoride or the boron trifluoride complex prepared by complexing boron trifluoride with a member of the class consisting of monohydric alcohols, phenols, water, mineral acids containing oxygen, aldehydes, esters, ethers, ketones and nitriles ($BF_3$ or $BF_3$ complex) to the organonickel compound (Ni) ranges from about 0.3/1 to 300/1 and wherein the mole ratio of the organoaluminum compound to the $BF_3$ or $BF_3$.complex ranges from about 0.1/1 to about 4/1.

5. The process according to claim 4 in which the Al/Ni mole ratio ranges from about 1/1 to about 150/1, the $BF_3$ or $BF_3$ complex/Ni mole ratio ranges from about 1/1 to about 150/1 and the Al/$BF_3$.complex mole ratio ranges from about 0.3/1 to about 1.4/1.

6. The process according to claim 3 in which the mole ratio of the organoaluminum compounds (Al) to the organonickel compound (Ni) ranges from about 0.3/1 to about 300/1; the mole ratio of the hydrogen fluoride (HF) or the hydrogen fluoride complex prepared by complexing hydrogen fluoride with a member of the class consisting of monhydric alcohols, phenols, water, mineral acids containing oxygen, aldehydes, esters, ethers, ketones and nitriles (HF or HF.complex) to the organonickel compound (Ni) ranges from about 2/1 to about 300/1 and the mole ratio of the hydrogen fluoride or hydrogen fluoride complex to the organoaluminum compound ranges from about 0.2/1 to about 15/1.

7. The process according to claim 6 in which the Al/Ni mole ratio ranges from about 2/1 to about 80/1, the HF or HFC/Ni mole ratio ranges from about 5/1 to about 100/1 and the mole ratio of HF or HFC/Al ranges from about 0.4/1 to about 7/1.

8. The process according to claim 1 in which the organonickel compound is selected from the group consisting of nickelbenzoate, ickelnaphthenate, nickeloctanoate, nickelstearate or bis(cyclopentadienyl-nickel), and nickeltetracarbonyl.

9. The process according to claim 1 in which the organoaluminum compound is selected from the group consisting of triisobutylaluminum and triethylaluminum.

10. The process according to claim 4 in which the fluoride compound is boron trifluoride complex prepared by reacting $BF_3$ with butylalcohol, ethylalcohol or butylether.

11. The process according to claim 6 in which the hydrogen fluoride complex is prepared by reacting hydrogen fluoride with butylalcohol or butylether.

12. The process according to claim 1 in which the molecular weight regulator is 1,4-pentadiene, 1,5-hexadiene, 1,6-heptadiene, 1,2,4-trivinylcyclohexane, and 1-trans-4-hexadiene.

13. The process according to claim 12 in which the molecular weight regulator is 1,5-hexadiene.

14. The process according to claim 12 in which the molecular weight regulator is 1-trans-4-hexadiene.

* * * * *

UNITED STATES PATENT OFFICE
CERTIFICATE OF CORRECTION

PATENT NO. : 4,383,097
DATED : May 10, 1983
INVENTOR(S) : Kenneth F. Castner and Paul H. Sandstrom It is certified that error appears in the above-identified patent and that said Letters Patent are hereby corrected as shown below:

Column 13, Line 35 - Formula: Please change structure to read as follows:

-- 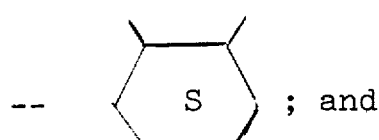 ; and 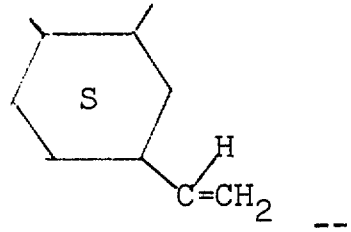 --

Signed and Sealed this

Thirteenth Day of December 1983

[SEAL]

Attest:

GERALD J. MOSSINGHOFF

Attesting Officer    Commissioner of Patents and Trademarks